United States Patent
Pietiläet al.

(10) Patent No.: US 6,882,306 B2
(45) Date of Patent: Apr. 19, 2005

(54) METHOD FOR DETERMINING A POSITION OF AN ELECTRONIC DEVICE USING A SATELLITE POSITIONING SYSTEM

(75) Inventors: Samuli Pietilä, Tampere (FI); Harri Valio, Kämmenniemi (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/438,746

(22) Filed: May 15, 2003

(65) Prior Publication Data

US 2004/0012523 A1 Jan. 22, 2004

(30) Foreign Application Priority Data

May 16, 2002 (FI) .............................. 20020929

(51) Int. Cl.⁷ .............................................. H04B 7/185
(52) U.S. Cl. .............................. 342/357.1; 342/357.01; 342/357.15
(58) Field of Search ....................... 342/357.01, 357.06, 342/357.13, 357.15, 357.1; 701/207, 213, 215

(56) References Cited

U.S. PATENT DOCUMENTS

| | | | |
|---|---|---|---|
| 6,075,987 A | * | 6/2000 | Camp et al. ................. 455/427 |
| 6,204,808 B1 | * | 3/2001 | Bloebaum et al. ...... 342/357.07 |
| 6,380,891 B1 | * | 4/2002 | Yamashita ............. 342/357.15 |
| 6,784,834 B1 | * | 8/2004 | Sirola et al. ........... 342/357.15 |

FOREIGN PATENT DOCUMENTS

| | | |
|---|---|---|
| FI | 108895 | 4/2002 |
| WO | 0036431 | 6/2000 |

OTHER PUBLICATIONS

"An Expanding–Search Algorithm for Coarse Acquisition of DSS Signals" by John S. Seybold et al, Military Communications Conference, 1996. Milcom '96. Conference Proceedings, IEEE McLean, VA. Oct. 21–24, 1996, New York, NY pp. 993–997.

* cited by examiner

Primary Examiner—Dao Phan (57) ABSTRACT

The present invention relates to a method for determining the position of an electronic device using satellites in a positioning system. In the method, satellite orbit data and a default position for the electronic device are determined. In the method, at least the following steps are taken: a determination step for determining a first time data estimate by using the default position, a computing step for computing an estimate of the code phase of the satellite signal on the basis of the time data estimate, the default position and the satellite orbit data, and a searching step, in which a code-modulated signal transmitted by satellites of a positioning system is received for searching the signal of at least one satellite and for acquiring the signal by using the estimate of the code phase. The invention also relates to a system, in which the method is applied, as well as to an electronic device.

18 Claims, 4 Drawing Sheets

METHOD FOR DETERMINING A POSITION OF AN ELECTRONIC DEVICE USING A SATELLITE POSITIONING SYSTEM

CROSS-REFERENCE TO RELATED APPLICATIONS

This application claims priority under 35 USC §119 to Finnish Patent Application No. 20020929 filed on May 16, 2002 and U.S. Ser. No. 10/436,033 filed May 12, 2003.

FIELD OF THE INVENTION

The present invention relates to a method for determining the position of an electronic device by means of satellites in a positioning system in which satellite orbit data is determined, and a default position is determined for the electronic device. The invention also relates to a system with means for determining the position of an electronic device by means of code-modulated signals transmitted by satellites in a positioning system, in which positioning system satellite orbit data is determined, and which system comprises means for determining a default position for the electronic device, the electronic device comprising means for receiving code-modulated signals transmitted by satellites of the positioning system. The invention further relates to an electronic device comprising means for positioning by means of code-modulated signals transmitted by satellites in a positioning system, in which positioning system satellite orbit data is determined, and which electronic device comprises means for determining a default position for the electronic device, and means for receiving code-modulated signals transmitted by satellites in the positioning system.

BACKGROUND OF THE INVENTION

Typically, positioning receivers utilizing the GPS system attempt to receive the signal of at least four different satellites, on the basis of which the position (x, y and z coordinates) of the positioning receiver as well as the time data of the GPS system are computed in the positioning receiver. The positioning is performed, for example, at the stage when the positioning receiver is turned on. It takes a long time to receive four different satellite signals, because the positioning receiver must perform acquisition of each of the signal to be received. For the acquisition and for receiving the signal from the satellites, a positioning receiver of prior art must find out the number, Doppler frequency and code phase of each signal to be received, before the signal can be received. The number of operations required for this step can be estimated by means of the number of satellites in the system, variations in the Doppler frequency, and the number of different code phases. For example, assuming that the satellite positioning system comprises 32 satellites, Doppler frequencies are searched from 21 different frequency ranges and there are 1023 different code phases, and the resolution of ½ chip is applied, the product of these numerical values will give an idea about the extent of the problem. With the above-presented figures, the number of different combinations for the acquisition of the signal from a single satellite will be in the order of 1,300,000 (=32×21× 2046). The above-presented numerical values correspond well to the situation in the GPS system presently in use.

In some cases, the above-presented situation is made easier by the fact that the positioning receiver has previously received the signal of the satellites and has some kind of estimation of its own position as well as satellite orbit data. It is thus possible to use a previously determined position as a default position. When the positioning receiver has some kind of time data, position data and satellite orbit data, it is possible, by calculation, to estimate the azimuth angles of the satellites to the positioning receiver and to use this data to restrict the acquisition of the signals of such satellites only, which are, on the basis of the computation, above the horizon in relation to the position of the positioning receiver at the time. Furthermore, assuming that the positioning receiver stays still or moves slowly in relation to the movement of the satellites, it is possible to further restrict the searching range of the Doppler frequency of the signal propagated along the line of sight.

However, the positioning receiver does not necessarily have precise time data of the GPS system, wherein the positioning receiver will not be capable of estimating the position of the satellites at a very high precision.

However, to restrict the searching range of the code phases, the positioning receiver should have very precise time data, because the length of one chip is very short. For example, in the GPS system, one chip is about 0.98 $\mu$s and the code iteration interval (epoch) is about 1 ms. Such precision cannot be achieved with conventional real time clocks (RTC) used in positioning receivers. Therefore, in conventional positioning receivers, the estimation of code phases of such satellite signals which have not been acquired, is not possible until the acquisition of signals from at least four different satellites has been completed and the position of the positioning receiver and the time data of the system have been determined on the basis of these signals. In conventional positioning receivers of the prior art, the acquisition of four signals is performed and the position and the time data are determined without knowledge about the code phase. First after these four different signals have been found and received and used for determining the time data of the system and the position of the positioning receiver at some precision, the signals of other satellites are searched and acquired by using the code phase data. The information to be determined on the basis of these satellites can be used to improve the positioning precision. This acquisition of four different satellite signals will take a long time, particularly if the signals are weak. In practice, the time taken for the acquisition may thus be several tens of minutes, even several hours, which, in most applications in practice, means that the positioning receiver cannot be used. Particularly indoors, the signal strength may be so weak that acquisition will not be possible and the positioning will not be successful.

The GPS satellite system applies two kinds of satellite orbit data, Ephemeris and Almanac, of which Ephemeris is the more accurate one. The accuracy of the Ephemeris orbit data is less than one metre, whereas the Almanac orbit data will indicate the satellite position at an accuracy of about 0 to 3 km. Each satellite only transmits the Ephemeris orbit data of its own, but the Almanac orbit data is transmitted to all the satellites.

SUMMARY OF THE INVENTION

It is an aim of the present invention to provide a method for accelerating the positioning of a positioning receiver, a positioning system, as well as an electronic device. The invention is based on the idea that the acquisition of the signal of one satellite is performed in the positioning receiver of an electronic device by using a known position, which is relatively close to the position of the electronic device at the time, as a default position for the electronic device. In an advantageous embodiment of the invention, this default position is the known location of a base station in a mobile communication network. On the basis of this default position and one satellite signal, it is possible to form a relatively precise estimate of the time data of the system, wherein this time data is used to estimate the code phase in signals of one or more other satellites. When the code phase is known within an accuracy of a few chips, it will be easier to search the satellite signals than by searching from all the different code phases possible. To put it more precisely, the present invention is primarily characterized in that the method comprises at least:

- a determination step for determining a first time data estimate by using said default position,
- a computing step for computing an estimate of the code phase of the satellite signal on the basis of said time data estimate, the default position and the satellite orbit data, and
- a searching step, in which a code-modulated signal transmitted from a satellite in a positioning system is received for searching the signal of at least one satellite and for acquiring the signal by using said estimate of the code phase.

The system according to the present invention is primarily characterized in, that the system comprises:

- means for determining a first time data estimate by using said default position,
- means for computing an estimate of the code phase of the satellite signal on the basis of said time data estimate, the default position and the satellite orbit data, and
- means for searching the signal of at least one satellite and for acquiring the signal by using said estimate of the code phase.

Furthermore, the electronic device according to the present invention is primarily characterized in that the electronic device comprises:

- means for determining a first time data estimate by using said default position,
- means for computing an estimate of the code phase of the satellite signal on the basis of said time data estimate, the default position and the satellite orbit data, and
- means for searching the signal of at least one satellite and for acquiring the signal by using said estimate of the code phase.

The present invention shows remarkable advantages over solutions of prior art. When applying the method according to the invention, it is possible to significantly accelerate the acquisition of signals from satellites used for positioning, because the inaccuracy in the estimate of the code phase can, by the method, be limited to a few chips after the time data has been determined relatively accurately by means of the default position and the signal of one satellite. Thus, by the method, even a quadruple rate can be easily achieved in positioning, compared with receivers of prior art. On the other hand, to improve the accuracy, the time of acquisition of a signal from a satellite can be even quadrupled, and the positioning can still be performed as fast as by positioning receivers of prior art. Fast positioning has, for example, the advantage of reducing the time of keeping the positioning receiver in the active state and thereby cutting down the power consumption of the positioning receiver, which is advantageous particularly in portable devices.

DESCRIPTION OF THE DRAWINGS

In the following, the invention will be described in more detail with reference to the appended drawings, in which.

DETAILED DESCRIPTION OF THE INVENTION

Figure 3:
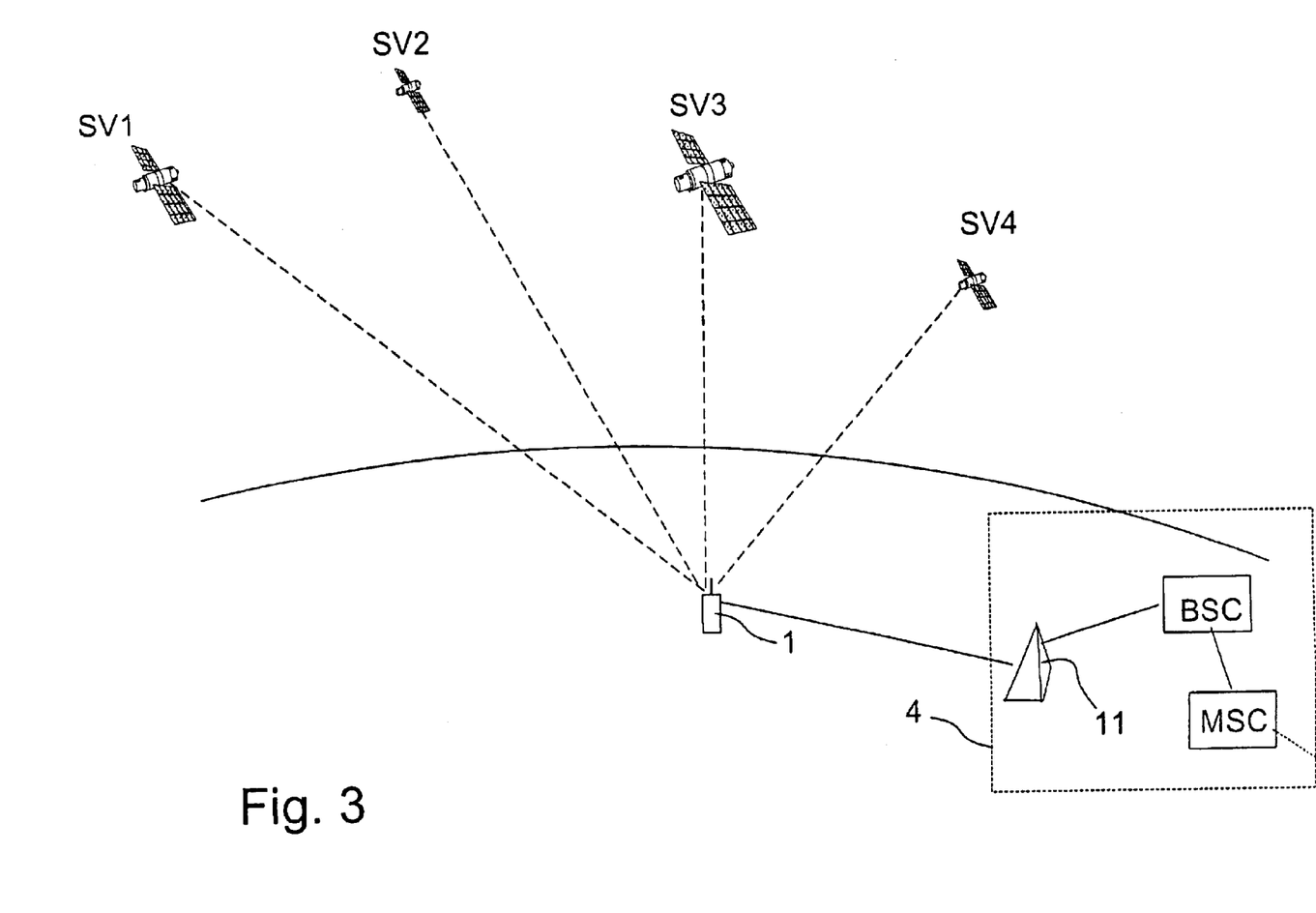
FIG. 3 shows a situation in which the method is applied.
Figure 4:
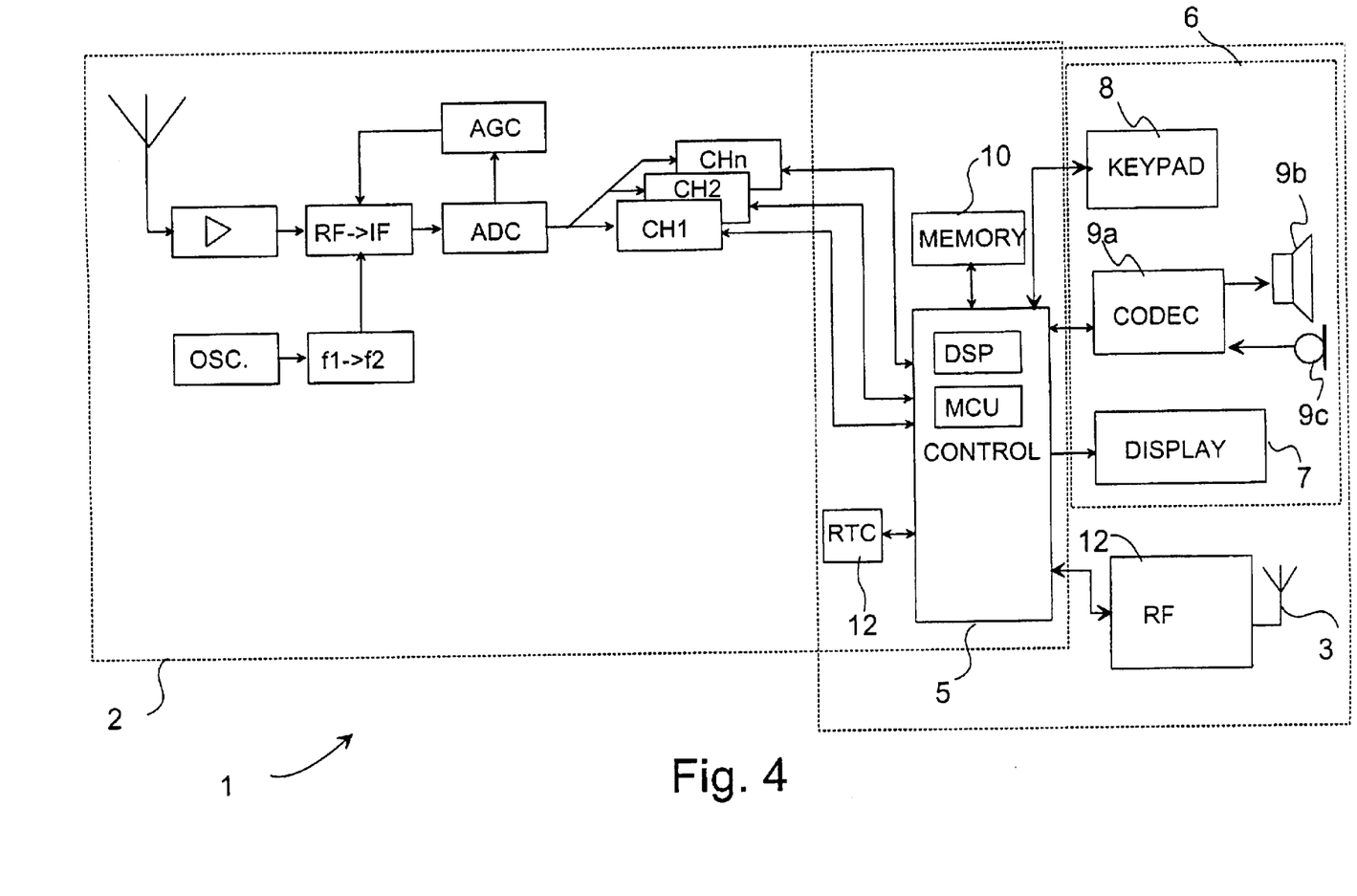
FIG. 4 shows a positioning receiver according to a preferred embodiment of the invention in a simplified block diagram.

In the following description, the method according to an advantageous embodiment of the invention will be exemplified with the GPS satellite positioning system, but it should be evident that the invention is not limited to use in this system only. FIG. 3 shows an example situation of applying the invention, and FIG. 4 shows an electronic device 1 according to an advantageous embodiment of the invention in a simplified block diagram. The electronic device 1 comprises, for example, a positioning receiver 2 as well as communication means 3, such as mobile communication means. By these communication means 3, the electronic device 1 may, if necessary, communicate with a communication network 4, such as a mobile communication network. Furthermore, the electronic device comprises a control block 5 which preferably comprises a processor MCU and/or a digital signal processor DSP. For the use, the electronic device 1 is provided with at least one user interface 6, preferably comprising a display 7, a keypad 8 and audio means 9a, 9b, 9c. For storing data and application software, the electronic device is provided with memory means 10.

When the electronic device 1 is turned on, it is preferably determined if the electronic device 1 contains satellite orbit parameters (Ephemeris orbit data and/or Almanac orbit data), previously determined position data and/or time data stored in it. If there is no sufficiently up-to-date orbit data, position data or time data, this is downloaded, for example, via the communication network 4. From the communication network 4, it is possible to download the orbit parameters, rough time data of the system, as well as position data of a reference point. The reference point used is preferably the position of a known point in the communication network 4, such as the position of the base station 11 which is used as the so-called serving base station for the electronic device 1 at the time, that is, as the base station via which the electronic device 1 and the communication network 4 are communicating. Typically, the distance between the electronic device 1 and the serving base station is not longer than some tens of kilometres, preferably not more than about 30 km. However, it should be evident that within the invention, the maximum distance may also be longer or shorter than 30 km.

Figure 1:
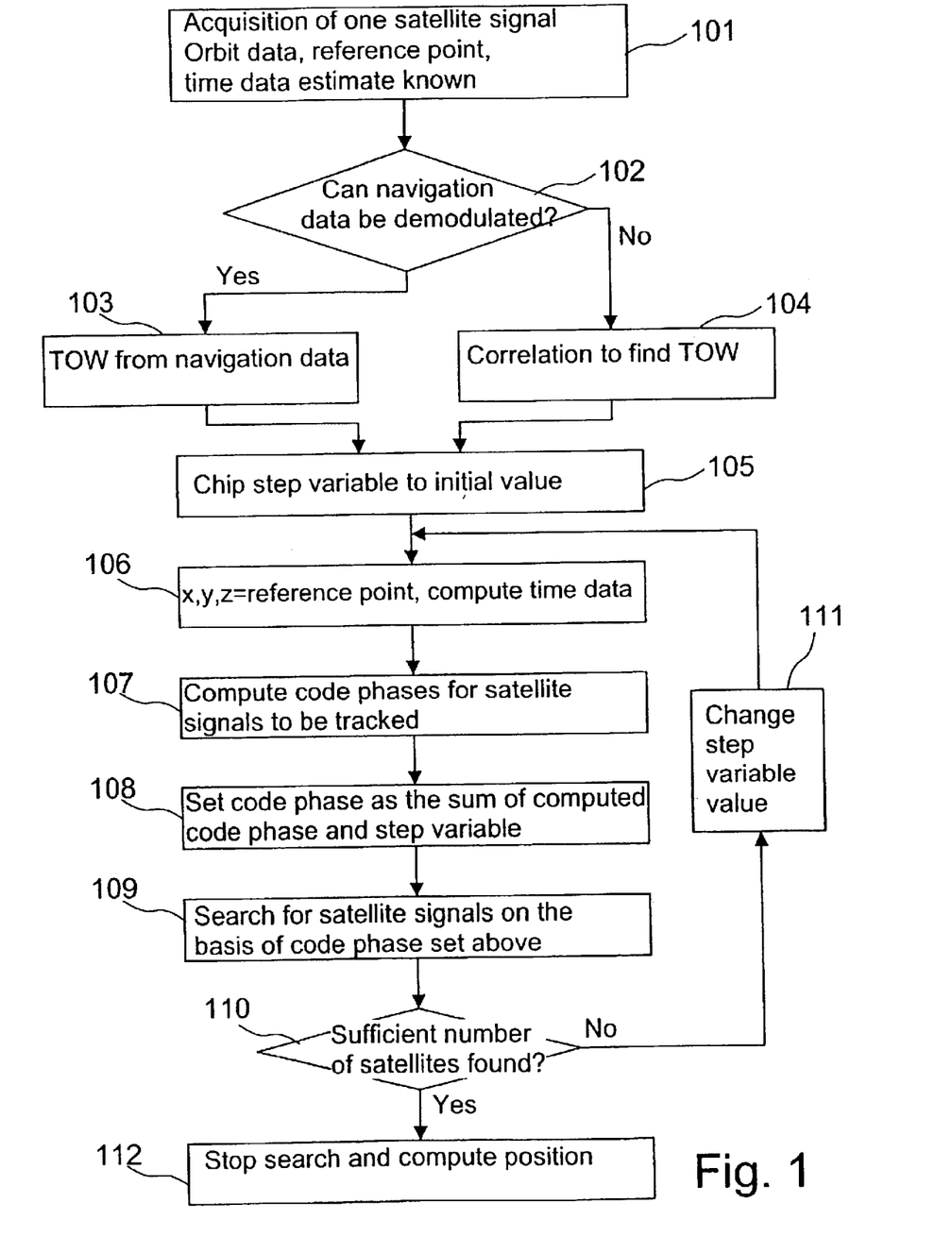
FIG. 1 shows the operation of the method according to a preferred embodiment of the invention in a simplified flow chart.

FIG. 1 shows, in a simplified block diagram, different steps in the method according to a preferred embodiment of the invention. The electronic device 1 selects a satellite transmitting a signal to receive, for example a first satellite SV1 in the situation of FIG. 3. In this selection of the satellite, it is possible to use methods of prior art. After this, the searching of the selected satellite signal, and its acquisition, if possible, is started in the positioning receiver 2. In the flow chart, step 101 shows the above-described determination of data and selection of the satellite.

For example, on the basis of the signal-to-noise ratio, it is examined in the positioning receiver if such a satellite signal can be received whose strength will be sufficient for the demodulation of navigation data transmitted in the signal (step 102). In a situation in which such a satellite signal, whose strength will be sufficient for the demodulation of navigation data transmitted in the signal, can be received in the positioning receiver 2, said time data can be determined directly from the satellite signal (step 103).

However, it is not always possible to find any satellite signal which would be sufficiently strong for the demodulation of navigation data. It is thus possible to use, for example, correlation methods, known as such, using known reference data which is correlated (preferably cross-correlated) with the satellite signal to be received (step 104). By means of the cross-correlation, an attempt is made to find such a point where the known reference data is present in the signal, and on the basis of this, the acquisition of the satellite signal is performed in the positioning receiver 2, to find the time of week data. The cross-correlation result will be the better, the longer the reference data that can be used in the cross-correlation.

In some situations, it is possible to use the orbit parameters stored in the memory means 10 of the electronic device 1 as the orbit parameters, the time data of the real time clock (RTC) 12 of the electronic device 1 as the time data, and a predetermined position stored in the memory means 10 of the electronic device 1 as the reference point position data. Thus, the receiver will not need any information from the communication network. However, the time data should be correct at a precision of a few seconds; preferably, the maximum error in the time data should be in the order of 3 s. The orbit parameters should be the valid ones, and the reference point position data should not be substantially less correct than the corresponding position data obtained from the communication network.

After the time of week (TOW) data has been determined, the chip step is set to its initial value, preferably zero (step 105). In the method according to an advantageous embodiment of the invention, this chip step will be used in the fine adjustment of the code phase, as will be presented below in this description.

Normally, the acquisition of at least four different satellite signals by the positioning receiver is needed to determine the three coordinates x, y, z of the position as well as the time data. In the present invention, the position of a known reference point, such as the position of said serving base station 11 in the mobile communication network, is set as the default position. Thus, the acquisition information determined above in step 103 or 104 on the basis of one satellite signal, as well as the selected position of the reference point, are used in the positioning receiver 2 to compute the time data (step 106). If the real positions of the reference point and the electronic device 1 are substantially the same, the time data determined at this stage will correspond to the real time data. In practical situations, however, the reference point does not normally fully correspond to the real position of the electronic device 1, but it may even have a deviation in the order of kilometres. In spite of this, the time data computed in step 106 will be very close to the real one, because in any case, the differences in the signal propagation times will be relatively small, the differences in the propagation distances being in the order of a few kilometres or some tens of kilometres. Utilizing this information, it is assumed that the determined time data can be used for determining the code phase in such a way that the error is in the order of a few chips at a maximum. This is a considerable improvement to the situation of the prior art, in which the correct code phase must be determined from even all the possible different code phases. For example, in the GPS system, this would mean scanning through 1023 different code phases even several times, if the searching is to be performed at several different frequencies to find out the correct Doppler frequency.

After the estimated time data has been determined on the basis of said reference point, orbit data and one satellite signal, the code phase estimate can be computed for all the signals of the satellites to be searched, at an accuracy of a few chips (step 107). The satellites to be searched are, for example, the second SV2, third SV3 and fourth SV4 satellites in the situation of FIG. 3. For each satellite signal to be searched, a default code phase is set, which is obtained by summing up the determined code phase and the value of the chip step (step 108). After this, said default code phase value is used in the positioning receiver 2 for signal acquisition (step 109). If the acquisition of a satellite signal to be searched is possible, the default code phase value is correct for this satellite. Advantageously, the positioning receiver 2 comprises several receiving channels CH1, CH2, CHn, preferably at least three receiving channels, wherein acquisition of one satellite signal to be searched can be attempted at each receiving channel substantially simultaneously. If there are fewer receiving channels than satellite signals to be tracked, the acquisition of the satellite signals to be tracked is performed at least partly consecutively.

In the next step 110, it is examined if a sufficient number of signals transmitted by satellites has been found, that is, if acquisition of all the satellite signals to be tracked has been completed. If the desired number of signals has been found, these signals can be used to further define the positioning and the time data by using position computation and time determination algorithms known as such (step 112). However, if a sufficient number of satellite signals was not found, the value of the chip step is changed in step 111, for example on the basis of a predetermined permutation algorithm. One such permutation algorithm is −0.5, +0.5, −1.0, +1.0, −1.5, +1.5, . . . ; that is, during the first permutation, the chip step is given the value −0.5, during the second permutation the value +0.5, during the third permutation the value −1.0, etc. Consequently, the value of the variable is changed on both sides of the zero point to find out the correct code phase value. However, it will be obvious that the present invention is not limited to this permutation algorithm only, but also another kind of permutation algorithm can be applied. After the value of the chip step has been changed, the operation will continue from step 106, where the three position coordinates x, y, z as well as the time data are recalculated to correspond to the situation at the time. Also the steps 107 to 110 are taken. If a sufficient number of satellite signals was still not found with this new code phase value either, the step 111 is taken again to change the value of the chip step, and the steps 106 to 110 are iterated. Said steps 106 to 111 are iterated until a sufficient number of satellite signals has been found, or until another criterion has been met, for example a maximum number possibly set for the iterations has been exceeded.

In the above-described method according to an advantageous embodiment of the invention, the accuracy of the time data to be computed in the first step is substantially directly proportional to the difference of the distances between the satellite used in the first step and the reference point, and between the satellite and the electronic device. This difference depends, for example, on the azimuth and the elevation angles of the satellite, and on the difference between the reference point and the real position.

Figure 2:
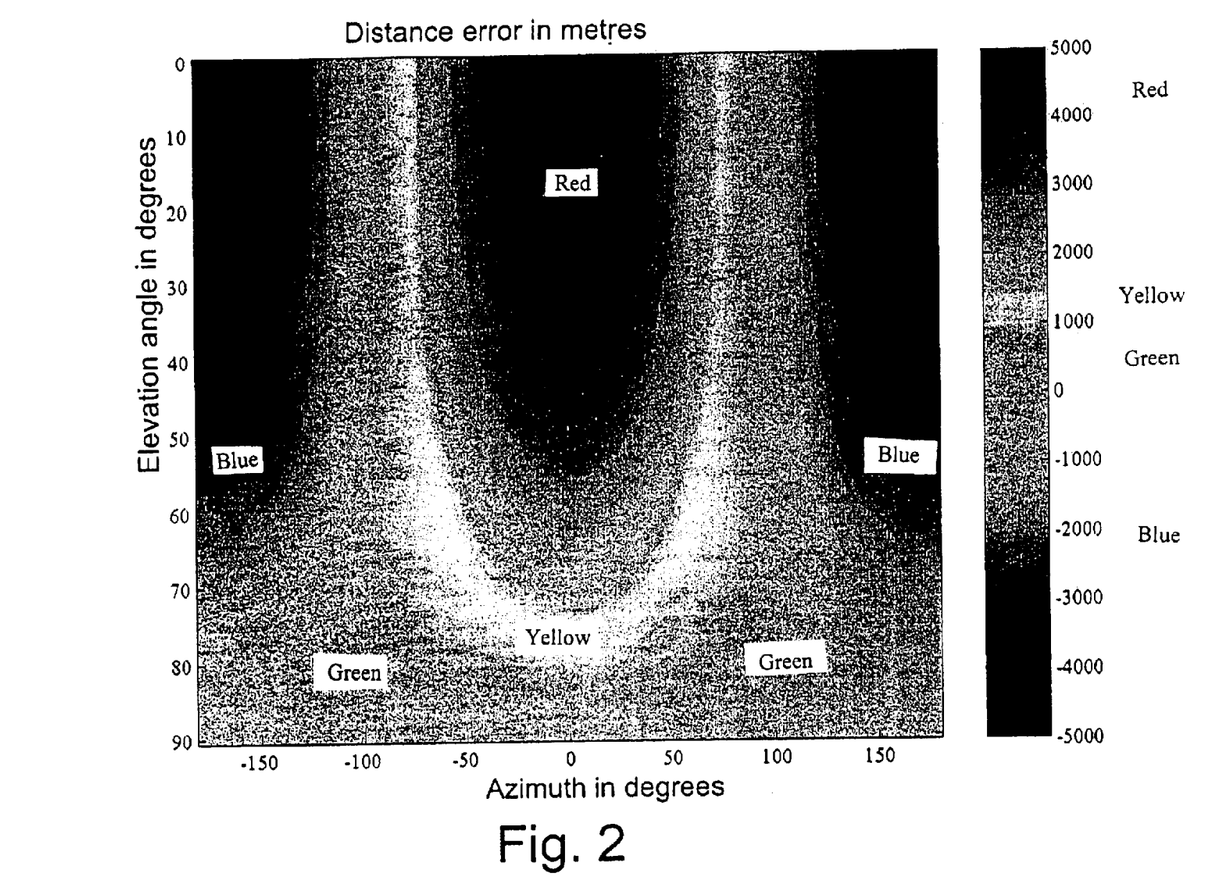
FIG. 2 shows the error in the distance between the satellite and the receiver as a function of the azimuth and the elevation angle of the satellite, when the horizontal distance between the default position and the real position of the receiver is about 5 km.

FIG. 2 illustrates the error in the distance between the satellite and the electronic device 1 as a function of the azimuth and the elevation angle of the satellite, when the distance between the reference point and the electronic device 1 is about 5 km. Here, it is assumed that both the electronic device 1 and the reference point are located on a plane, and that the satellite orbit is at the height of 20,000 km in relation to the reference point. From FIG. 2, it can be seen, for example, that when the elevation angle is large, preferably in the order of 80 to 90°, or when the azimuth is close to ±90°, the distance error is, in practice, insignificant. In such situations, the time data solved by the method of the invention is very close to the real time data, wherein the code phase data computed for the other satellites to be searched on the basis of it are very accurate. Correspondingly, when the satellite is close to the horizon, wherein the elevation angle is small, and the azimuth is preferably in the order of 0 or ±180°, the distance error is in the order of ±5 km. In such a situation, the distance between the reference point and the electronic device causes a distance error which is substantially of the corresponding magnitude. This distance error of 5 km corresponds to an error of approximately 16.7 ns in the time data, wherein the error in the computed code phase will be about 17 chips. However, this error is reduced when the value of said chip step is changed by permutation and by iteration of said steps 106 to 111.

Consequently, the function of the chip step is to compensate for the error in the estimated time data, which is due to the use of the reference point as the default position. If the permutation limits used for the value of the chip step are, for example, ±20 chips, it is possible, by the method according to the invention, to eliminate an error in the order of 5.8 km (=290 m/chip×20 chips) in the estimated distance between the satellite and the electronic device. In practice, for example in network-based positioning, wherein a mobile communication network is used for positioning of an electronic device 1, the error in the positioning will be less than 5 km. Thus, by the method according to the invention, the accuracy can be improved, without a need to change the value of the chip step more than ±20 chips. Thus, the number of iterations of the steps 106 to 111 can be kept within reasonable limits. In connection with network-based positioning, the reference point used is not necessarily the position of the serving base station 11 but position data obtained in network-based positioning.

In a method according to another advantageous embodiment of the invention, sufficiently accurate time data is transmitted to the electronic device 1 via a communication network 4, such as a mobile communication network. Thus, the positioning device 2 does not need to find the signal of the first satellite and to perform acquisition of this signal, but it is possible in the method to move on from the step 101 directly to the step 105, in which the chip step is set to its initial value. In other respects, the steps of the method correspond to the above-presented steps 106 to 111.

The invention can also be applied in such a way that the position of the reference point is changed instead of adjusting the time data. At the stage when the position of the reference point is sufficiently close to the real position of the electronic device 1, it is possible to search the desired satellite signals, if they are accessible in the location of the positioning device 1 at all. However, it is more efficient to change the time data, because the change in the time data will have no effect on the geometry between the satellites and the positioning receiver.

Instead, the change of the reference point will alter, for example, the azimuths and/or the elevation angle in relation to the reference point.

The method according to the invention can be primarily implemented by software in the control block of the electronic device 1. As the positioning receiver 2 of the electronic device 1 according to the invention, it is possible to use receiver structures known as such.

The invention can also be applied in situations in which the positioning receiver 2 has, for a moment, lost such a satellite signal which the positioning receiver 2 has acquired. Also in such a situation, the above-described method is used, that is, for the positioning, the signal of one satellite is tracked or the time data is received from the communication network and the acquisition of the signals of the other satellites is performed. In solutions of prior art, however, so-called re-acquisition is performed, utilizing the previously obtained code phase information and possibly the latest determined position data.

It should be evident that the present invention is not limited solely to the above-presented embodiments but it can be modified within the scope of the appended claims.

What is claimed is:

1. A method for determining the position of an electronic device by means of satellites in a positioning system, where satellite orbit data is determined, signal of a satellite is selected for receiving, acquisition information is determined on the basis of the signal from the selected satellite, and a default position is determined for the electronic device, wherein the method comprises at least:

a determination step for determining a first time data estimate by using said satellite orbit data, said acquisition information and said default position of the electronic device, a computing step for computing an estimate of the code phase of the satellite signal on the basis of said time data estimate, the default position and the satellite orbit data, wherein said computing does not require said satellite signal to be demodulated, and a searching step, in which a code-modulated signal transmitted by satellites of a positioning system is received for searching the signal of at least one satellite and for acquiring the signal by using said estimate of the code phase.

2. The method according to claim 1, comprising changing said time data estimate, if acquisition of the signal from at least one other satellite cannot be performed on the basis of said first time data estimate, wherein said computing step and searching step are iterated, and that during each iteration, an altered time data estimate is used in said computing step.

3. The method according to claim 1, wherein the electronic device is used to receive information from a communication network, wherein the data about said default position is received from the communication network.

4. The method according to claim 3, wherein said communication network used is a mobile communication network with base stations for communication between the communication network and the electronic device, and that said default position used is the position of the base station through which the communication between the mobile communication network and the electronic device is carried out.

5. The method according to claim 3, wherein said communication network used is a mobile communication network, in which the position of the electronic device is determined, and that said default position used is the position of the electronic device determined in the communication network.

6. The method according to claim 1, comprising receiving the signal of one satellite for determining said first time data estimate, and performing acquisition of this signal to be received.

7. The method according to claim 1, comprising transmitting said first time data estimate from the communication network to the electronic device.

8. A system with means for determining the position of an electronic device by means of code-modulated signals transmitted by satellites in a positioning system, in which positioning system satellite orbit data are determined, and which system comprises means for selecting a signal of a satellite for receiving, means for determining acquisition information on the basis of the signal from the selected satellite, means for determining a default position for the electronic device, the electronic device comprising means for receiving code-modulated signals transmitted by satellites in the positioning system, wherein the system comprises:

means for determining a first time data estimate by using said satellite orbit data, said acquisition information and said default position of the electronic device, means for computing an estimate of the code phase of the satellite signal on the basis of said time data estimate, the default position and the satellite orbit data, wherein said computing does not require said satellite signal to be demodulated, and means for searching the signal of at least one satellite and for acquiring the signal by using said estimate of the code phase.

9. The system according to claim 8, comprising means for changing said time data estimate, if acquisition of at least one other satellite signal has not been possible on the basis of said first time data estimate, means for computing an estimate of the code phase of the satellite signal and for iterating the searching of the satellite signal, and means for using a changed time data estimate for each iteration.

10. The system according to claim 8, in which the electronic device is used to receive information from a communication network, wherein the electronic device comprises means for receiving data about said default position from the communication network.

11. The system according to claim 10, wherein said communication network is a mobile communication network with base stations for communication between the mobile communication network and the electronic device, and that said default position used is arranged to be the position of the base station through which the communication between the mobile communication network and the electronic device is arranged to be carried out.

12. The system according to claim 10, wherein said communication network is a mobile communication network with means for determining the position of the electronic device, and that said default position used is arranged to be the position of the electronic device determined in the mobile communication network.

13. The system according to claim 8, wherein the means for determining said first time data estimate comprise means for receiving the signal of one satellite and means for acquisition of the received signal.

14. The system according to claim 8, comprising means for transmitting said first time data estimate from the communication network to the electronic device.

15. An electronic device comprising means for determining the position by means of code-modulated signals transmitted by satellites in a positioning system, in which positioning system satellite orbit data are determined, and which electronic device comprises means for selecting a signal of a satellite for receiving, means for determining acquisition information on the basis of the signal from the selected satellite, means for determining a default position for the electronic device, and means for receiving code-modulated signals transmitted by satellites in the positioning system, wherein the electronic device comprises:

means for determining a first time data estimate by using said satellite orbit data, said acquisition information and said default position of the electronic device, means for computing an estimate of the code phase of the satellite signal on the basis of said time data estimate, the default position and the satellite orbit data, wherein said computing does not require said satellite signal to be demodulated, and means for searching the signal of at least one satellite and for acquiring the signal by using said estimate of the code phase.

16. The electronic device according to claim 15, comprising means for changing said time data estimate, if acquisition of at least one other satellite signal has not been possible on the basis of said first time data estimate, means for computing an estimate of the code phase of the satellite signal and for iterating the searching of the satellite signal, and means for using a changed time data estimate for each iteration.

17. The electronic device according to claim 15, comprising means for storing orbit data of said satellites.

18. The electronic device according to claim 15, comprising means for performing mobile station functions.

* * * * *

UNITED STATES PATENT AND TRADEMARK OFFICE
CERTIFICATE OF CORRECTION

PATENT NO. : 6,882,306 B2
DATED : April 19, 2005
INVENTOR(S) : Harri Valio and Samuli Pietilä

It is certified that error appears in the above-identified patent and that said Letters Patent is hereby corrected as shown below:

Title page,
Item [56], References Cited, U.S. PATENT DOCUMENTS, please add the reference:
-- 6,133,874 10/2000 Krasner --.

Signed and Sealed this

Sixteenth Day of August, 2005

JON W. DUDAS
*Director of the United States Patent and Trademark Office*